United States Patent
Maruoka et al.

(10) Patent No.: US 9,773,172 B2
(45) Date of Patent: Sep. 26, 2017

(54) OBSTACLE ALERT DEVICE

(75) Inventors: Tetsuya Maruoka, Anjo (JP); Akira Kadoya, Kitanagoya (JP); Keigo Ikeda, Anjo (JP)

(73) Assignee: AISIN SEIKI KABUSHIKI KAISHA, Aichi-ken (JP)

(*) Notice: Subject to any disclaimer, the term of this patent is extended or adjusted under 35 U.S.C. 154(b) by 24 days.

(21) Appl. No.: 14/237,459

(22) PCT Filed: Nov. 1, 2011

(86) PCT No.: PCT/JP2011/075126
§ 371 (c)(1),
(2), (4) Date: Feb. 6, 2014

(87) PCT Pub. No.: WO2013/065121
PCT Pub. Date: May 10, 2013

(65) Prior Publication Data
US 2014/0197940 A1    Jul. 17, 2014

(51) Int. Cl.
*G06K 9/00* (2006.01)
*B60R 1/00* (2006.01)
*G08G 1/16* (2006.01)

(52) U.S. Cl.
CPC ............ *G06K 9/00771* (2013.01); *B60R 1/00* (2013.01); *G06K 9/00778* (2013.01);
(Continued)

(58) Field of Classification Search
CPC .......... G08B 13/1961; G08B 13/19606; G08B 13/19608; G08B 13/19613;
(Continued)

(56) References Cited

U.S. PATENT DOCUMENTS 4,737,847 A * 4/1988 Araki et al. ................. 348/161
6,327,522 B1 * 12/2001 Kojima ................. B60K 35/00
348/115

(Continued)

FOREIGN PATENT DOCUMENTS

JP        11-115660 A    4/1999
JP     2003274393 A    9/2003
(Continued)

OTHER PUBLICATIONS

Communication dated Feb. 5, 2015, issued by the Japan Patent Office in corresponding Japanese Application No. 2013-541510.
(Continued)

*Primary Examiner* — Van Trieu
(74) *Attorney, Agent, or Firm* — Sughrue Mion, PLLC

(57) ABSTRACT

An obstacle alert device is capable of indicating clearly presence of an obstacle approaching a vehicle to a driver, without impairing visibility of a peripheral situation of the vehicle. The device includes a photographed image acquisition section acquiring a photographed image photographing a scene in the periphery of the vehicle, a photographed-image-of-interest generation section generating a photographed image of interest based on the photographed image, a masked region setting section setting a masked region making undisplayed at least a portion of the scene of the vehicle periphery in the photographed image of interest, an object presence determination section determining whether an object is present or not in an outside region outside the photographed image of interest, and a masked-region highlighted-displaying section causing the masked region to be displayed with highlight when an object in the outside region has entered a region corresponding to the photographed image of interest.

5 Claims, 4 Drawing Sheets

(52) U.S. Cl.
CPC ........ *G08G 1/166* (2013.01); *B60R 2300/307* (2013.01); *B60R 2300/806* (2013.01); *B60R 2300/8093* (2013.01)

(58) Field of Classification Search
CPC ........... G06K 9/00771; G06K 9/00778; G06K 9/00785; G06K 9/00891
See application file for complete search history.

(56) References Cited

U.S. PATENT DOCUMENTS

| | | | | |
|---|---|---|---|---|
| 7,483,549 | B2* | 1/2009 | Nagaoka | G06K 9/00362 340/435 |
| 7,672,510 | B2* | 3/2010 | Nagaoka et al. | 382/170 |
| 7,957,556 | B2* | 6/2011 | Aimura et al. | 382/103 |
| 8,170,752 | B2* | 5/2012 | Shimazaki et al. | 701/42 |
| 8,306,263 | B2* | 11/2012 | Nagaoka et al. | 382/103 |
| 8,564,661 | B2* | 10/2013 | Lipton et al. | 348/143 |
| 2005/0063565 | A1* | 3/2005 | Nagaoka | B60R 21/013 382/104 |
| 2005/0073585 | A1* | 4/2005 | Ettinger et al. | 348/155 |
| 2005/0275723 | A1* | 12/2005 | Sablak | H04N 7/183 348/169 |
| 2005/0276450 | A1 | 12/2005 | Taniguchi et al. | |
| 2006/0115115 | A1* | 6/2006 | Nagaoka | G06K 9/00362 382/103 |
| 2007/0183679 | A1* | 8/2007 | Moroto | G06T 11/60 382/254 |
| 2009/0097708 | A1 | 4/2009 | Mizuta | |
| 2012/0236024 | A1* | 9/2012 | Fujii | G06T 1/00 345/620 |
| 2012/0294482 | A1* | 11/2012 | Kasaoki | 382/103 |

FOREIGN PATENT DOCUMENTS

| | | |
|---|---|---|
| JP | 2005352974 A | 12/2005 |
| JP | 2009-40272 A | 2/2009 |
| JP | 2009-100095 A | 5/2009 |
| JP | 2009-217740 A | 9/2009 |

OTHER PUBLICATIONS

English translation of International Preliminary Report on Patentability for PCT/JP2011/075126 dated May 15, 2014.
International Search Report for PCT/JP2011/075126 dated Dec. 6, 2011.

* cited by examiner

OBSTACLE ALERT DEVICE

CROSS REFERENCE TO RELATED APPLICATIONS

This application is a National Stage of International Application No. PCT/JP2011/075126 filed Nov. 1, 2011, the contents of which are incorporated herein by reference in their entirety.

TECHNICAL FIELD

The present invention relates to an obstacle alert device indicating clearly presence of an obstacle approaching a vehicle to a vehicle occupant.

BACKGROUND ART

In the periphery of a vehicle, there is a blind spot not visible from the position of a driver. Hence, the driver needs to pay great attention to the periphery of the vehicle during driving of the vehicle. In particular, when the vehicle is to be parked by reversing, many users have awareness of not being good at parking operations per se, so they suffer from mental fatigue to no small extent. Then, conventionally, there has been taken advantage of a technique of monitoring an obstacle in the periphery of a vehicle (e.g. Patent Documents 1 and 2).

An obstacle alert device for a vehicle disclosed in Patent Document 1 includes a transversely moving obstacle detecting means, a transverse movement direction detecting means, and a transverse movement information providing means. The transversely moving obstacle detecting means detects an obstacle which is moving in a direction transverse to the traveling direction in front of the vehicle. The transverse movement direction detecting means detects the transverse movement direction of the obstacle detected by the transversely moving obstacle detecting means. The transverse movement information providing means provides the driver with information relating to the transverse movement direction of the obstacle detected by the transverse movement direction detecting means. In this, the transverse movement information providing means causes a display unit to display in its monitoring screen an arrow representing the transverse movement direction detected by the transverse movement direction detecting means.

A vehicle periphery monitoring device disclosed in Patent Document 2 includes a photographing means, an obstacle detecting means and a displaying means. The photographing means photographs a vehicle periphery including a portion of a self vehicle. The obstacle detecting means detects an obstacle located in the vehicle periphery and calculates a distance between the detected obstacle and the self vehicle. The displaying means displays, in a single monitoring screen, the photographed image photographed by the photographing means and an obstacle displaying image indicative of the distance calculated by the obstacle detecting means.

PRIOR ART

Patent Documents

Patent Document 1: Japanese Unexamined Patent Application Publication No. 11-115660

Patent Document 2: Japanese Unexamined Patent Application Publication No. 2009-217740

SUMMARY OF THE INVENTION

Object to be Achieved by Invention

As shown by the techniques disclosed by Patent Document 1 and Patent Document 2, it is possible to alert a driver to presence of an obstacle in the vehicle periphery by detecting the obstacle in the vehicle periphery and displaying information (arrow or the like) indicating this obstacle clearly. However, the monitoring screen size of the display unit (displaying means) mounted on a vehicle is not so large. For this reason, if an arrow or the like showing the situation of the vehicle periphery shown on the monitoring screen is displayed on the image, this may make the vehicle periphery situation less visible or even make the grasping of the obstacle impossible.

The object of the present invention is to provide an obstacle alert device capable of indicating clearly presence of an obstacle approaching a vehicle to a driver, without impairing visibility of a peripheral situation of the vehicle.

Means for Achieving the Object

For achieving the above-noted object, according to a characterizing feature of an obstacle alert device relating to the present invention, the device comprises:

a photographed image acquisition section acquiring a photographed image photographing a scene in the periphery of the vehicle;

a photographed-image-of-interest generation section generating a photographed image of interest based on the photographed image;

a masked region setting section setting a masked region making undisplayed at least a portion of the scene of the vehicle periphery in the photographed image of interest;

an object presence determination section determining whether an object is present or not in an outside region outside the photographed image of interest; and a masked-region highlighted-displaying section causing the masked region to be displayed with highlight when an object in the outside region has entered a region corresponding to the photographed image of interest.

With the above-described characterizing feature, presence of an object approaching a vehicle can be indicated clearly to the driver, without reduction in the visibility of the object when the object is displayed within the monitoring screen of the displaying device (e.g. a monitor) mounted in the vehicle. Therefore, even when the monitoring screen size of the displaying device is small, an object approaching the vehicle will not be overlooked. Further, since the masked region alone is flashed, there occurs no deterioration in the visibility of the situation of the vehicle periphery for the driver. Therefore, it has become possible to indicate clearly presence of an obstacle (an object) approaching a vehicle to a driver, without impairing visibility of a peripheral situation of the vehicle.

Preferably, the highlighted displaying comprises a flashing displaying.

With the above arrangement, it becomes possible to indicate clearly approaching of an obstacle visually to the driver. Consequently, the driver can recognize approaching of the obstacle in an even more effective manner.

Further preferably, the masked region is set at an upper portion of the monitoring screen.

With the above arrangement, the highlighted displaying can be provided at an upper portion of the monitor screen, so that the visibility for the driver is improved. Therefore, approaching of the object can be clearly indicated in an effective manner.

Preferably, the masked-region highlighted-displaying section stops the highlighted displaying of the masked region if the object has exited the region corresponding to the photographed image of interest.

With the above arrangement, it becomes possible to indicate clearly to the driver movement of the object away from the vehicle.

MODES OF EMBODYING THE INVENTION

Next, modes of embodying the present invention will be described in details. An obstacle alert device 100 relating to the present invention has a function of clearly indicating approaching of an object if any approaching a vehicle to the driver of this vehicle. Next, an explanation will be made with reference to the accompanying drawings.

Figure 1:
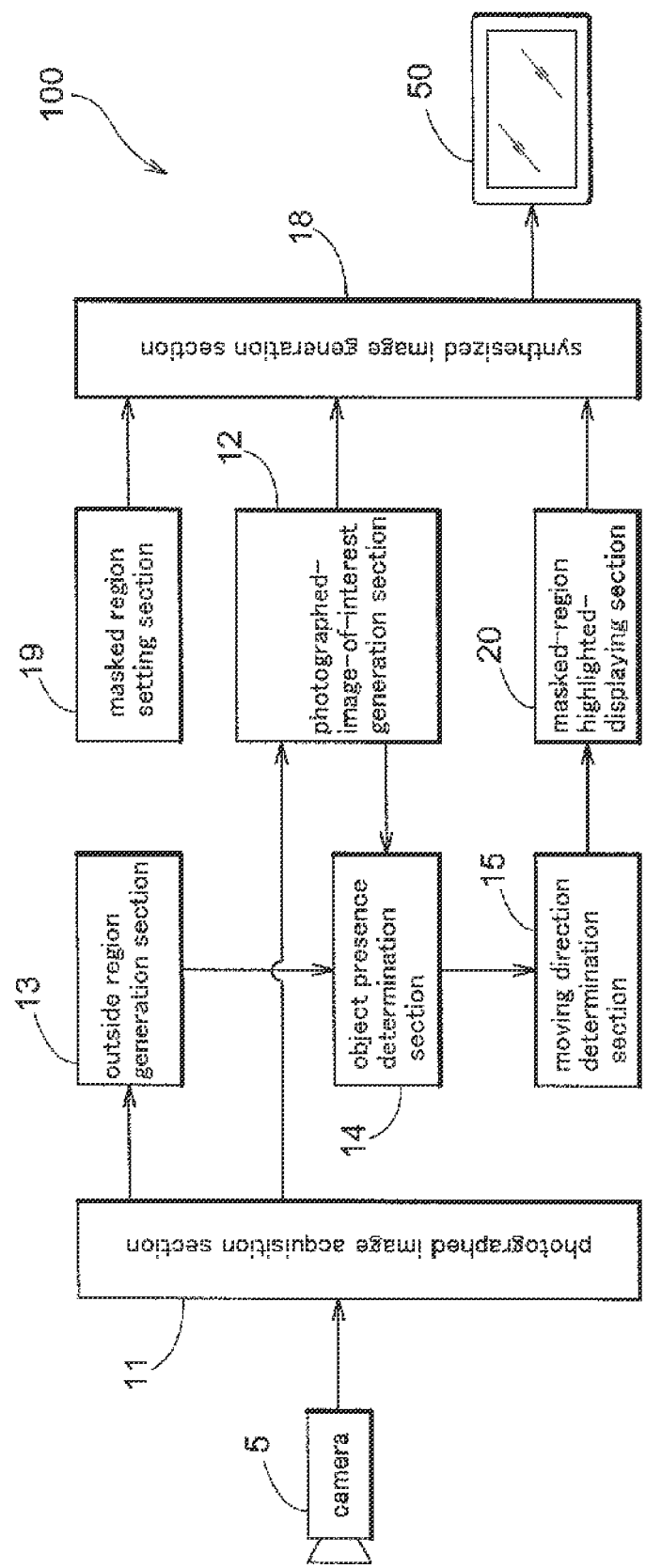
FIG. 1 is a block diagram schematically showing an arrangement of an obstacle alert device.

FIG. 1 is a block diagram schematically showing an arrangement of the obstacle alert device 100. As shown in FIG. 1, the obstacle alert device 100 includes respective functional sections of: a photographed image acquisition section 11, a photographed-image-of-interest generation section 12, an outside region generation section 13, an object presence determination section 14, a moving direction determination section 15, a synthesized image generation section 18, a masked region setting section 19, and a masked-region highlighted-displaying section 20. The respective functional sections are configured in the form of hardware having a CPU as a core component thereof and/or software for effecting various processes for indicating clearly approaching of an object 7 to the driver of the vehicle 1.

Figure 2:
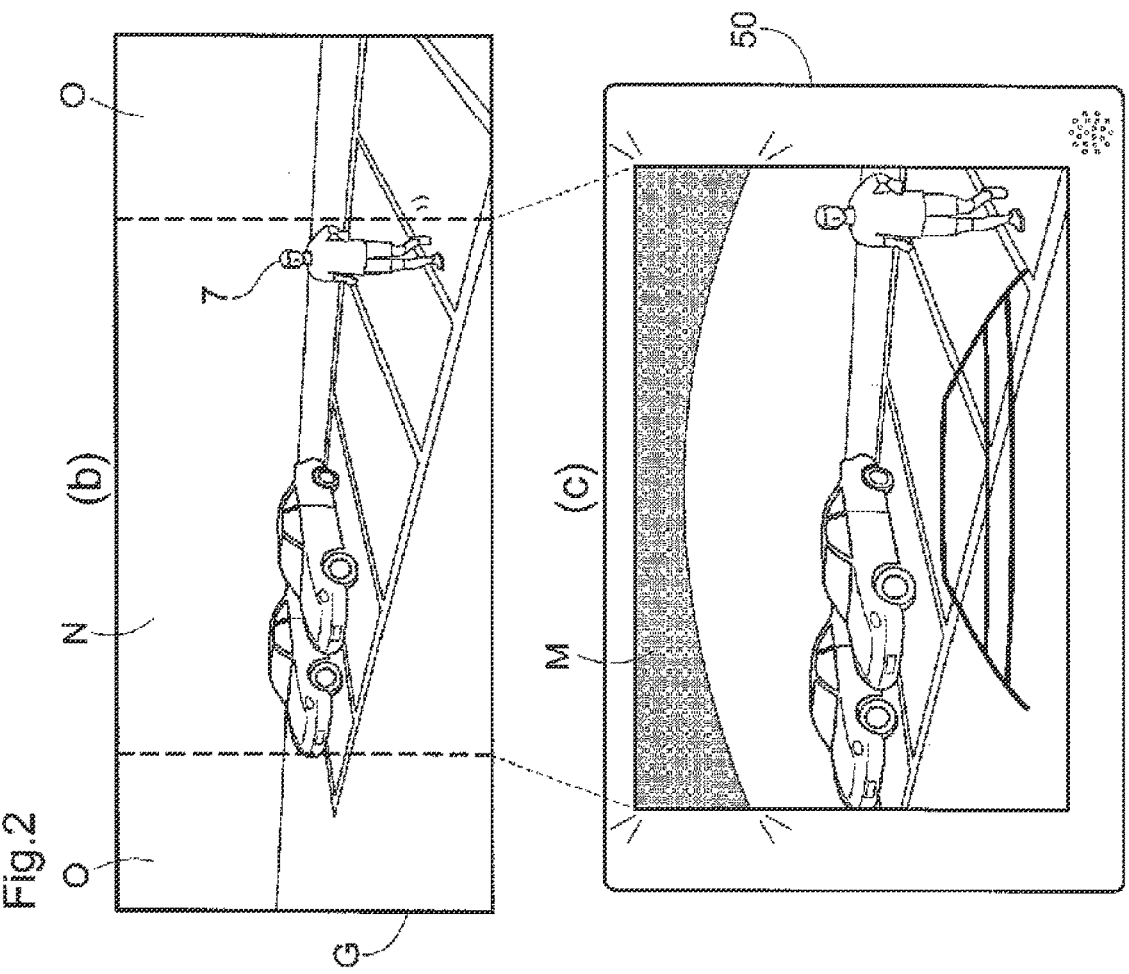
FIG. 2 is a view showing one example of a processing effected by the obstacle alert device.
Figure 2:
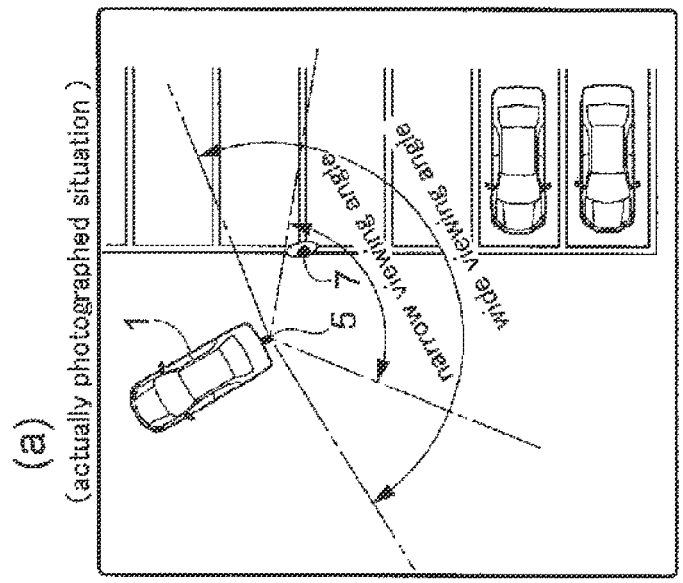

The photographed image acquisition section 11 acquires a photographed image G photographing a scene in the periphery of the vehicle 1 and comprises, in this case, a camera 5 mounted in the vehicle 1. The camera 5 employed in the instant embodiment incorporates an image capturing device such as a CCD (charged coupled derive) or a CIS (CMOS image sensor) and comprises a digital camera configured to output photographed information in the form of video information. Such camera 5, as shown in FIG. 2 (a), is disposed e.g. adjacent a license plate attached to an outside rear portion of the vehicle 1 or adjacent an emblem plate attached to an outside rear portion of the vehicle 1, with the camera 5 being oriented toward the rear side of the vehicle 1 with a slight angle of depression. Further, this camera 5 has a wide-angle lens (not shown). With this, the camera 5 can photograph the scene in the periphery of the vehicle 1 over an approximately 180 degrees of angle rearwardly of the vehicle 1. Such photographic range is shown as "wide viewing angle" in FIG. 2 (a). This camera 5 has an ability of outputting video image of photographed images G in real time. Such photographed image G is transmitted to the photographed image acquisition section 11.

One example of the photographed image G is shown in FIG. 2(b). The total width of FIG. 2 (b) corresponds to the wide viewing angle shown in FIG. 2 (a). Here, the photographed image G is subject to a mirror processing such that an object 7 present on the left side as the vehicle 1 is viewed from the rear side thereof will appear on the right side within the photographed image G as shown in FIG. 2 (b). This is done for facilitating sensory recognition for the driver of the vehicle 1 to determine whether the object 7 included in the photographed image G is present on the left side or the right side of the vehicle 1.

Referring back to FIG. 1, the photographed-image-of-interest generation section 12 generates a photographed image of interest based on the photographed image G. In the instant embodiment, the photographic range of the photographed image G is a wide viewing angle. For this reason, the photographed-image-of-interest generation section 12 generates, as a photographed image of interest, a narrow field-of-vision region N which is the center portion of the photographed image G. Advantageously, this narrow field-of-vision region N is set as a region ranging from about 120 to 130 degrees, rearwardly of the vehicle 1. Further, as this narrow field-of-vision region N approximates the range of possible traveling for the vehicle 1 when it travels backwards, thus constituting a region of particular interest in the photographed image G; hence, this region will be referred to as "a photographed image of interest". Such photographed image of interest corresponds to a displaying image to be displayed on a monitor 50 to be described later (see FIG. 2 (c)). Incidentally, in the instant embodiment, "the photographed image of interest" will be explained as the image of "narrow viewing angle range".

The outside region generation section 13 generates an outside region O on the outside of the photographed image of interest. That is, the section 13 generates the outside region O outside the narrow field-of-vision region N in the photographed image G. As described above, at the transversely center portion of the photographed image G, the photographed-image-of-interest generation section 12 generates the narrow field-of-vision region N. Then, on the outside of this narrow field-of-vision region N, the outside region generation section 13 generates the outside region O such as the one shown in FIG. 2 (b). The outside region O generated by the outside region generation section 13 is transmitted to the object presence determination section 14 to be described later.

The object presence determination section 14 determines whether an object 7 is present in the outside region O or not. This determination of presence/absence of the object 7 can be done with using a known image recognition process such as a pattern matching. Needless to say, it is also possible to determine whether an object 7 is present in the outside region O or not by using any other processing than the pattern matching. The result of this determination by the object presence determination section 14 is transmitted to the moving direction determination section 15 to be described later.

The moving direction determination section 15 determines the moving direction of the object 7 in the outside region O. This determination of moving direction is effected when the object presence determination section 14 has determined presence of an object 7 in the outside region O. In particular, in the instant embodiment, the moving direction determination section 15 determines whether the object in the outside region O is moving toward the narrow field-of-vision region N or not. Moving toward the narrow field-of-vision region N refers to movement from the widthwise outer side of the vehicle 1 along the direction immediately rearwardly of the vehicle 1. Such determination can be made by e.g. comparing the position of the object 7 in the current photographed image G and the position of this object 7 in a photographed image acquired before a predetermined period, or can be made by using such a known technique as the optical flow technique. And, the result of this moving direction determination is transmitted to a clear indication image outputting section 16 to be described later.

The masked region setting section 19 sets a masked region M making undisplayed at least a portion of the scene of the vehicle periphery in the photographed image of interest. In the instant embodiment, the masked region M is set at an upper portion of the displaying screen, i.e. an upper portion within the photographed image, as shown in FIG. 2 (c). This masked region M is formed over the opposed sides in the transverse direction of the photographed image of interest. The inner side of the masked region M will be painted in e.g. black color so as to mask the scene upwardly of the vehicle 1. Needless to say, it may be painted in a different color.

The masked-region highlighted-displaying section 20 causes the masked region M to be displayed with highlight in case the object M in the outside region M has entered the region corresponding the photographed image of interest, that is, the narrow field-of-vision region N. In this embodiment, the highlighted displaying, i.e. displaying with highlight, is a flashing displaying. Determination of whether the object 7 in the outside region M has entered the narrow field-of-vision region N or not is effected by the moving direction determination section 15. Then, in accordance with the determination result of the moving direction determination section 15, the masked region highlighted-displaying section 20 causes the masked region M to be displayed with flashing on and off. With this, it is possible to clearly indicate to the driver of the vehicle 1 visually the presence of the object M in the narrow field-of-vision region N, so that the driver can be alerted.

Further, the masked region highlighted-displaying section 20 stops the highlighted displaying of the masked region M in case the object M has exited the region corresponding the photographed image of interest, that is, the narrow field-of-vision region N. Determination of whether the object 7 has exited the narrow field-of-vision region N or not too can be effected by the moving direction determination section 15. That is, the moving direction determination section 15 can determine that the object 7 has exited the narrow field-of-vision region N if there is an object 7 moving into the outside region O from the side of the narrow field-of-vision region N of the outside region O. The result of this determination too is transmitted to the masked region highlighted-displaying section 20. Further, in the instant embodiment, the highlighted displaying is a flashing displaying. Accordingly, upon receipt of such determination result as above transmitted thereto, the masked region highlighted-displaying section 20 stops the flashing on/off of the masked region M. With this, it becomes possible to indicate clearly to the driver of the vehicle 1 absence of the object 7 in the narrow field-of-vision region N.

Figure 3:
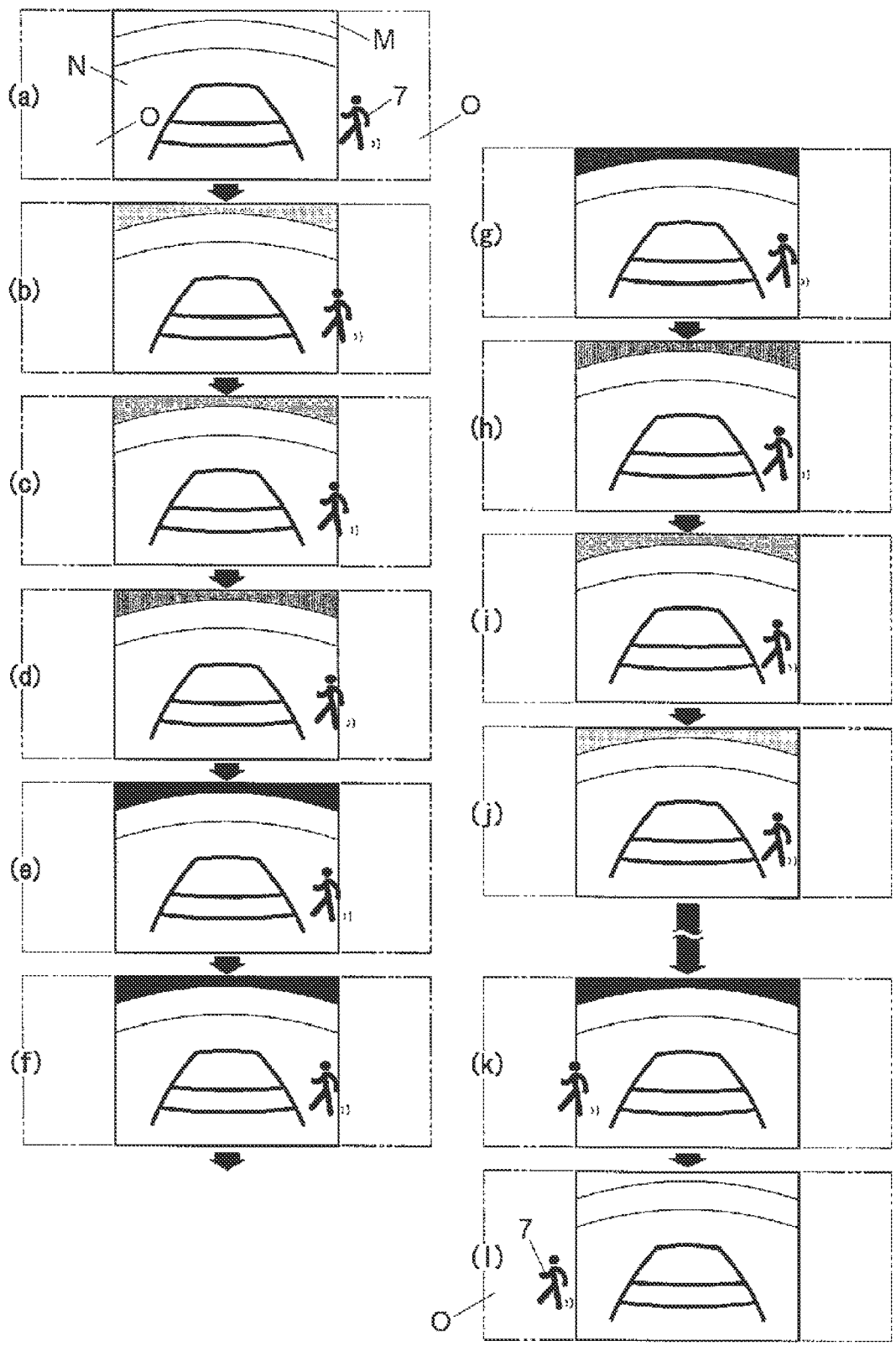
FIG. 3 is a view showing one example of a flashing processing of a masked region.

FIG. 8 shows one example of image relating to the flashing of the masked region M which is effected in case the object 7 (a human) has moved from the outside region O into the narrow field-of-vision region N. As shown in FIG. 3 (a), if the object 7 has entered the narrow vision field N from the outside region O (in this example, the outside region O on the right side), as shown in FIGS. 3 (b) through (f), the masked region M is painted in a different color (e.g. "red") than its original color (e.g. "black").

Thereafter, as shown in FIG. 3 (g) through (j), the masked region M is returned from the other color above (e.g. "red") to the original color (e.g. "black"). Such painting operation in the original color and a different color will be effected in repetition until the object 7 exits the narrow field-of-vision region N and enters the outside region O (in this example, the outside region O on the left side) (FIGS. 3 (k) and (i)). With this, in the case of presence of an object 7 in the narrow field-of-vision region N, the masked region M can be displayed with flashing, so that the presence of the object 7 in the periphery of the vehicle 1 can be clearly indicated to the driver of the vehicle 1 so that the driver can be alerted.

Figure 4:
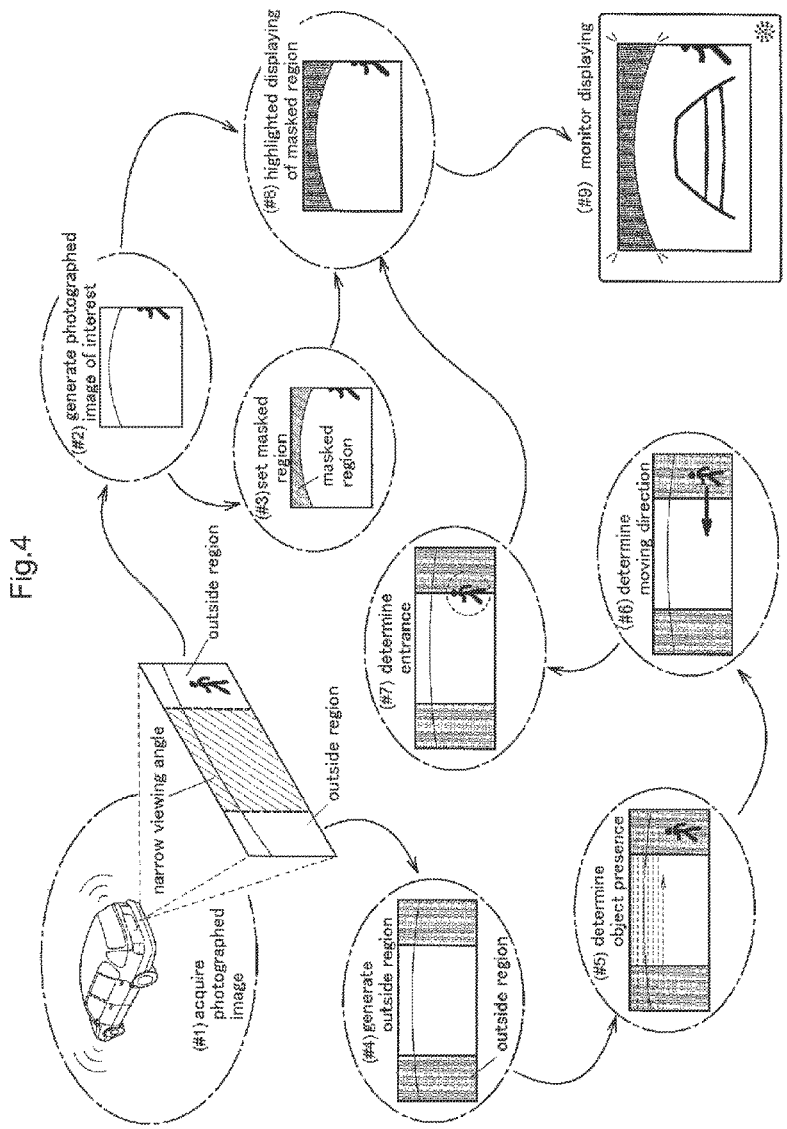
FIG. 4 is a view schematically showing a processing effected by the obstacle alert device.

Next, with reference to the diagram of FIG. 4, there will be explained a series of operations when the obstacle alert device 100 causes flashing displaying of the masked region M. Firstly, the photographed image acquisition section 11 acquires a photographed image G photographed by the camera 5 of the vehicle 1 (step #1).

Next, the photographed-image-of-interest generation section 12 generates the center portion of the acquired photographed image G as a photographed image of interest (step #2). Further, in this photographed image of interest, the masked region M is set (step #03). On the other hand, the outside region generation section 13 generates the transversely opposed portions of the acquired photographed image G as an outside region O (step #04). Then, the object presence determination section 14 determines whether an object 7 is present in the outside region O thus generated (step #05).

Subsequent to the determination of presence of the object 7 in the outside region O, the moving direction determination section 15 determines the moving direction of this object 7 (step #6). In case the moving direction of the object 7 is the direction from the outside region O toward the narrow field-of-vision region N corresponding to the photographed image of interest, it is determined that the object 7 has entered the narrow field-of-vision region N (step #7). In this case, the masked region highlighted-displaying section 20 causes highlighted displaying of the masked region M inside the photographed image of interest (step #8).

As described above, when the object 7 has entered the narrow field-of-vision region N, the masked region M is flashed, thereby to allow the driver of the vehicle 1 to pay close attention to the vicinity of the vehicle 1 and to allow also clearly indicating approaching of the object 7.

As described above, with the obstacle alert device 100 relating to the present invention, when an object 7 approaching the vehicle 1 appears in the monitoring screen of the monitor 50 mounted in the vehicle 1, it is possible to clearly indicate to the driver the presence of the object 7 approaching the vehicle 1, without reduction in the visibility of the object 7. That is, it becomes possible to alert the driver to the presence of the object 7 approaching the vehicle 1. Therefore, even if the screen size of the monitor 50 is small, the object 7 approaching the vehicle 1 will not be overlooked. Further, as the masked region M alone is flashed, there occurs no difficulty for the driver in viewing the situation of the periphery of the vehicle 1. Accordingly, it becomes possible to clearly indicate to the driver the presence of the obstacle (object 7) approaching the vehicle 1, without causing difficulty in viewing the situation of the periphery of the vehicle 1.

Other Embodiments

In the foregoing embodiment, it was explained that the masked region highlighted-displaying section 20 stops the highlighted displaying of the masked region M in case the object 7 has exited the narrow field-of-vision region N. However, the application of the present invention is not limited thereto. Alternatively, it is also possible as a matter of course to configure the masked-region highlighted-displaying section 20 to stop the highlighted displaying of the masked region M after lapse of a predetermined period subsequent to entrance of the object 7 from the outside region O to the narrow field-of-vision region N. Further alternatively, it is also possible as a matter of course to configure the masked-region highlighted-displaying section 20 to stop the highlighted displaying of the masked region M after lapse of a predetermined period subsequent to exit of the object 7 from the narrow field-of-vision region N.

In the foregoing embodiment, it was explained that the photographed-image-of-interest generation section 12 generates, as a photographed image of interest, the narrow field-of-vision region N which is the center portion of the photographed image G. However, the application of the present invention is not limited thereto. Alternatively, it is also possible as a matter of course to employ this photographed image G as it is as the photographed image of interest, in case the photographed image G is acquired by a camera 5 having a narrow viewing angle corresponding to the narrow field-of-vision region N, for example. In such case, advantageously, the determination of presence/absence of an object 7 in the outside region O is effected with detection by a sonar or the like, for instance.

INDUSTRIAL APPLICABILITY

The present invention is applicable to an obstacle alert device for indicating clearly presence of an obstacle approaching a vehicle to a vehicle occupant.

DESCRIPTION OF REFERENCE MARKS/NUMERALS

1: vehicle
7: object
11: photographed image acquisition section
12: photographed-image-of-interest generation section
14: object presence determination section
19: masked region setting section
20: masked-region highlighted-displaying section
100: obstacle alert device
G: photographed image
M: masked region
O: outside region

The invention claimed is:

1. An obstacle alert device comprising:
a photographed image acquisition section acquiring a photographed image photographing a scene in the periphery of the vehicle;
a photographed-image-of-interest generation section generating a photographed image of interest based on the photographed image;
a masked region setting section setting a masked region at an upper portion of a monitoring screen, the masked region making undisplayed at least a portion of the scene of the vehicle periphery in the photographed image of interest;
an object presence determination section determining whether an object is present or not in an outside region outside the photographed image of interest; and
a masked-region highlighted-displaying section causing the masked region to be displayed with highlight when an object in the outside region has entered a region corresponding to the photographed image of interest,
wherein the masked region is colored in a predetermined color and the rest of the photographed image of interest is displayed in a different color from the color of the masked region,
wherein the photographed image of interest and the masked region are simultaneously displayed on the monitoring screen, and
wherein when the object in the outside region has entered the region corresponding to the photographed image of interest, the color of the masked region is changed from the predetermined color to the different color to clearly indicate to the driver of the vehicle that the object has entered the region corresponding to the photographed image of interest.

2. The obstacle alert device according to claim 1, wherein the highlighted displaying comprises a flashing displaying.

3. The obstacle alert device according to claim 1, wherein the masked-region highlighted-displaying section stops the highlighted displaying of the masked region if the object has exited the region corresponding to the photographed image of interest.

4. The obstacle alert device according to claim 1, wherein the photograph image to be acquired is captured with a camera having a wide-angle lens.

5. The obstacle alert device according to claim 1, wherein the masked region is colored in the predetermined color and the different color alternately until the object moves from the region corresponding to the photographed image of interest to the outside region.

* * * * *